| United States Patent [19]
Arai et al.

[11] Patent Number: 4,960,847
[45] Date of Patent: Oct. 2, 1990

[54] ROOM TEMPERATURE VULCANIZABLE ORGANOPOLYSILOXANE COMPOSITION

[75] Inventors: Masatoshi Arai; Shinichi Satoh, both of Annaka, Japan

[73] Assignee: Shin-Etsu Chemical Co., Ltd., Japan

[21] Appl. No.: 216,163

[22] Filed: Jul. 7, 1988

[30] Foreign Application Priority Data

Jul. 8, 1987 [JP] Japan ................. 62-170373

[51] Int. Cl.$^5$ ............................ C08G 77/20
[52] U.S. Cl. ....................... 528/32; 528/33; 528/34; 528/901; 525/477
[58] Field of Search ............ 528/32, 33, 34, 901; 525/477

[56] References Cited

U.S. PATENT DOCUMENTS

| | | | |
|---|---|---|---|
| 3,997,497 | 12/1976 | Itoh et al. | 528/32 |
| 4,356,116 | 10/1982 | Beers | 524/837 |
| 4,503,210 | 3/1985 | Von Au et al. | 528/33 |
| 4,689,363 | 10/1987 | Inoue et al. | 524/394 |

FOREIGN PATENT DOCUMENTS

| | | | |
|---|---|---|---|
| 57-174347 | 10/1982 | Japan | 528/901 |
| 60231761 | 11/1982 | Japan | 528/901 |

Primary Examiner—Lewis T. Jacobs
Assistant Examiner—R. Dean, Jr.
Attorney, Agent, or Firm—Lowe, Price, LeBlanc, Becker & Shur

[57] ABSTRACT

A room temperature vulcanizable organopolysiloxane composition capable of yielding a cured product exhibiting an improved resistance to oil and improved adhesiveness to metals, which comprises a diorganopolysiloxane blocked with a hydroxyl group at both ends of the molecule, an organosilane or siloxane having at least two hydrolyzable groups, each bonded to a silicone atom, in one molecule, and an organosilane or siloxane having at least one vinyl group and at least one hydroxyl group, each bonded to a silicon atom, in one molecule. The composition may further comprise a filler.

13 Claims, 1 Drawing Sheet

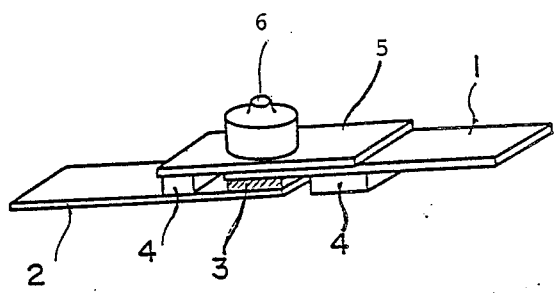

ROOM TEMPERATURE VULCANIZABLE ORGANOPOLYSILOXANE COMPOSITION

BACKGROUND OF THE INVENTION

1. Field of the Invention

This invention relates to organopolysiloxane compositions and more particularly, to room temperature vulcanizable organopolysiloxane compositions which are capable of yielding cured products having a good resistance to oil and are particularly useful as a sealing material for foamed in place gasket (FIPG) systems of automobiles.

2. Description of the Prior Art

Sealing in and around engines of automobiles has been heretofore made using oil-resistant gaskets and/or packings made of cork, organic rubbers, asbestos and the like. However, disadvantages are involved in that these materials are rather expensive, and stock and process controls of these gaskets and packings are complicated, coupled with another disadvantage that the sealing properties are not necessarily satisfactory.

To avoid the above disadvantage, the FIPG system using room temperature vulcanizable silicone rubbers has been now adopted, and good results are obtained with respect to workability, sealability and heat resistance. Because of the recent trend toward a low fuel cost, gear oils used in transmissions of automobiles are being replaced by oils of the low viscosity multi-grade type containing large amounts of extreme pressure additives. This causes the problem that the molding made of the organopolysiloxane rubber deteriorates when used over a long term at high temperatures, thus causing oil leakage.

In order to solve the above problem involved in the room temperature vulcanizable silicone rubbers, Japanese Laid-open patent application No. 57-76055 proposes the use of reinforcing silica and magnesium oxide having a specific surface area of not less than 50 m²/g in combination with the silicone rubbers. Moreover, Japanese Laid-open patent application No. 59-80463 describes the addition of zinc carbonate or zinc oxide to the rubbers. In the recent automobile industry, high performance engine oils or gear oils which contain large amounts of extreme pressure additives are employed. In addition, it is required that the FIPG sealing material have good durability and adhesiveness at high temperatures. In this regard, the known silicone rubber compositions are not satisfactory.

SUMMARY OF THE INVENTION

It is accordingly an object of the invention to provide a room temperature vulcanizable organopolysiloxane composition which is highly resistant to various oils including engine and gear oils and has good adhesiveness when vulcanized.

It is another object of the invention to provide a room temperature vulcanizable organopolysiloxane composition which is particularly useful as an FIPG material in the automobile industry.

It is a further object of the invention to provide a room temperature vulcanizable organopolysiloxane composition which is crosslinked with the aid of moisture in the air. The room temperature vulcanizable organopolysiloxane composition according to the invention comprises:

100 parts by weight of a diorganopolysiloxane blocked with a hydroxyl group at both ends of the molecule;

from 0.5 to 30 parts by weight of an organosilane or siloxane having at least two hydrolyzable groups bonded to the silicon atom or atoms in one molecule; and from 0.1 to 100 parts by weight of an organosilane or siloxane having at least one vinyl group and at least one hydroxyl group each bonded to a silicone atom in the molecule. The composition may further comprise a filler in an amount of not larger than 500 parts by weight per 100 parts by weight of the diorganopolysiloxane.

BRIEF DESCRIPTION OF THE DRAWING

The sole FIG. is a schematic perspective view showing the manner of measuring an adhesive strength under shear of rubber compositions used in the examples.

DETAILED DESCRIPTION AND EMBODIMENTS OF THE INVENTION

The diorganopolysiloxane and the organosilane or siloxane having at least two hydrolyzable groups bonded to a silicon atom or atoms in one molecule which are used as first and second ingredients of the composition of the invention are known per se as a combination. From the combination, a rubbery elastomer is obtained by condensation of the hydroxyl groups in the first ingredient and the hydrolyzable groups in the second ingredient.

The hydroxydiorganopolysiloxane of the first ingredient is one which is blocked with a hydroxyl group at both ends thereof and is represented by the following general formula

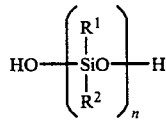

In the above formula, $R^1$ and $R^2$ are independently an alkyl grouping having from 1 to 8 carbon atoms such as a methyl group, an ethyl group, a propyl group or the like, a cycloalkyl group such as a cyclohexyl group, an alkenyl group having from 1 to 8 carbon atoms such as a vinyl group, an allyl group or the like, an aryl group such as a phenyl group, a tolyl group or the like and those groups indicated above which are partially substituted with a halogen atom, and n is a value of 5 or over which is determined in such a way that the viscosity of the diorganopolysilocane at 25° C. is in the range of from 25 to 500,000 centistokes, preferably from 1,000 to 100,000.

The organosilane or siloxane used as the second ingredient of the composition of the invention should have at least two hydrolyzable groups bonded to a silicon atom or atoms in the molecule. The hydrolyzable groups serve to readily condensate with the hydroxyl groups of the first ingredient to cure or vulcanize the composition of the invention. The hydrolyzable groups include, for example, an alkoxy group having from 1 to 8 carbon atoms such as a methoxy group, an ethoxy group, a propoxy group, an isopropoxy group, a butoxy group or the like, an organoketoxime group such as an acetoxime group, a butanoxime group, and the like, an organoamino group such as a dimethylamino group, a diethylamino group, a cyclohexylamino group, an organoamido group such as an N-methylacetamido group, a diorganoaminoxy group such as a dimethylaminoxy group, a diethylaminoxy group or the like, and an alkenyloxy group such as a propenloxy group. The at least two hydrolyzable groups may be the same or different provided that two or more hydrolyzable groups are contained in one molecule. As mentioned before, the second ingredient may be an organosilane or an organopolysiloxane. Specific examples of the organosilane include alkoxy compounds such as methyltrimethoxysilane, vinyltrimethoxysilane, methyltriethoxysilane, vinyltriethoxysilane, ethylortho-silicate, propylortho-silicate, and the like, enoxy compounds such as methyltripropenoxysilane, vinyltriisopropenoxysilane and the like, oxime compounds such as methyltris(acetone oxime)silane, methyltris(butanone oxime)silane and the like, amide compounds such as methyltris(dimethylamino)silane, methyltris(diethylamino)silane, methyltris(N-methylacetamido)silane, vinyltris(N-ethylacetamido)silane and the like, and aminoxy compounds such as methyltris(dimethylaminoxy)silane, methyltris(diethylaminoxy)silane and the like. Examples of the organosiloxane include siloxane compounds of a low degree of polymerization which have a linear, branched or cyclic siloxane structure and the functional groups mentioned before. These siloxane compounds are obtained by partial condensation of the silanes indicated above or by reaction of the silanes with siloxane compounds.

If the organosilane or siloxane is used in too small an amount, the resultant composition does not crosslink to a satisfactory extent. On the other hand, when the amount is excessive, a molded article obtained from such a composition is too hard and thus becomes brittle. In addition, the latter composition cannot be cured or vulcanized within a short time. Accordingly, the second ingredient is generally used in an amount of from 0.5 to 30 parts by weight per 100 parts by weight of the first ingredient.

The third ingredient used in the composition of the invention is an organosilane or organopolysiloxane having at least one vinyl group and at least one hydroxyl group, each bonded to a silicon atom, in the molecule. This ingredient acts to improve an oil resistance and adhesiveness of a silicone rubber molded article obtained by curing the first and second ingredients used in the invention. The incorporation of this type of organosilane or organopolysiloxane is important in the practice of the invention. As is known in the art, an extreme pressure additive in an engine oil or gear oil generates a thiole compound under heating conditions. The thiole compound reacts with iron to form a coating on the iron surface, thereby preventing a piston or gear from seizing. However, the thiole compound adversely influences the adhesiveness of silicone rubber. When an organosilane or organosiloxane containing the vinyl group and hydroxyl group is added, the silicone rubber is significantly improved in the oil resistance and adhesiveness. Thus, the problem of the adverse influences of the thiole compound can be completely solved by the incorporation of the organosilane or organosiloxane.

Examples of the organosilane useful as the third ingredient are those of the following formulae (1) to (3):

Examples of the organosiloxane are those of the following formulae (4) to (6)

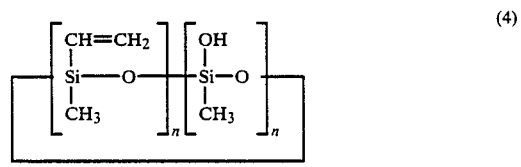

in which n=2 to 3 and m=1 to 2 provided that n+m=4,

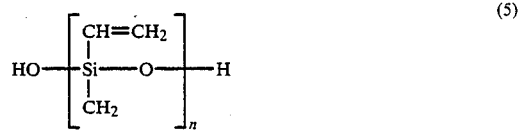

in which n=2 to 1,000, and

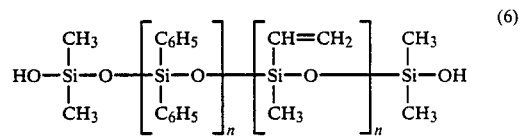

in which n, m=1 to 500.

Alternatively, branched vinyl group-containing organosiloxanes may be used, which are obtained by cohydrolysis of a monofunctional chlorosilane and a trifunctional or tetrafunctional silane. Examples of such a monofunctional chlorosilane include trimethylchlorisilane, vinyldimethylchlorosilane, divinylmethylchlorosilane, trivinylchlorosilane and the like. Examples of the tri or tetrafunctional silane include tetrachlorosilane, methyltrichlorosilane, phenyltrichlorosilane, vinyltrichlorosilane and the like.

The third ingredient is generally used in an amount of from 0.1 to 100 parts by weight, preferably from 0.5 to 30 parts by weight, per 100 parts by weight of the first diorganopolysiloxane ingredient. When the amount of the third ingredient is less than 0.1 part by weight, it may be difficult to obtain a silicone rubber molded article having a good oil resistance. Over 100 parts by weight, physical properties of a cured product obtained from the resultant composition will deteriorate more or less.

The fourth ingredient optionally used in the composition of the invention is a filler which is added so as to improve the strength of a silicone rubber molded article obtained by curing the composition. This filler is not an essential ingredient but may be added if desired. The filler may be any known one ordinarily used for this purpose and include, for example, fumed silica, precipitated silica, magnesium oxide, zinc carbonate, basic zinc carbonate, zinc oxide, carbon black, titanium dioxide, ferric oxide, aluminium oxide, calcium carbonate, quartz powder, diatomaceous earth, calcium silicate, talc, bentonite and the like. In addition, fibrous fillers such as asbestos, glass fibers, organic fibers and the like may also be used. The filler is used in an amount not larger than 500 parts by weight, preferably from 10 to 200 parts by weight, per 100 parts by weight of the first ingredient.

The composition of the invention may be obtained by uniformly mixing predetermined amounts of the first to third ingredients with or without addition of the fourth ingredient in a dry atmosphere or substantially moisture-free conditions. In this case, the composition is a one-can room temperature vulcanizable composition. Alternatively, a uniform mixture of the first and third ingredients with or without the fourth ingredient, and the second ingredient may be separately packed and mixed together upon application. The composition of the invention undergoes a crosslinking reaction by the action of moisture in air, and is converted into a rubbery elastomer. For facilitating the reaction, known catalysts such as, for example, amine compounds, quaternary ammonium salts, organometallic compounds, titanium chelating compounds, guanidyl group-containing compounds and the like may be added to the composition. Moreover, oil resistance improvers such as potassium methacrylate, colorants, heat or cold-resistance improvers, thixotropic agents, dehydrators, and adhesives such as silane couplers may be added. These additives may be used in amounts not impeding the characteristic properties of the composition of the invention.

As will be apparent from the foregoing, the respective ingredients of the composition of the invention are all known per se. However, it has been unexpectedly found that when an organosilane or organosiloxne having at least one vinyl group and at least one hydroxyl group, each bonded to a silicon atom in the molecule, is added to known room temperature vulcanizable organopolysiloxane compositions, the resultant composition is significantly improved in oil resistance and adhesiveness. In view of the ready availability of the third ingredient, the composition of the invention has a great practical merit.

The composition of the invention exhibiting a high oil resistance, good adhesiveness and high sealability when cured has wide utility as an FIPG material in the automobile industry and a sealing material for engines, transmissions, differential gears and the like such as of power cultivators, various construction machines and the like. The composition is also useful as a sealing material for various parts requiring a high oil resistance in the fields of the construction industry, electric industry and electronic industry.

The present invention is more particularly described by way of examples, in which parts are by weight unless otherwise indicated and viscosities are those measured at 25° C.

EXAMPLES 1-5 AND COMPARATIVE EXAMPLE 1.

100 parts of dimethylpolysiloxane blocked with a hydroxyl group at both ends and having a viscosity of 5,200 centistokes, 8 parts of vinyltriisopropenoxysilane, 0.7 parts of a guanidyl group-containing silane compound of the following formula

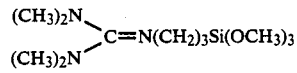

1.0 part of gamma-aminopropyltriethoxysilane, 100 parts of quartz powder, and 15 parts of fumed silica were mixed in a water-free condition to obtain sample I. Thereafter, organosilanes and organosiloxanes having at least one vinyl group and at least one hydroxyl group, bonded to a silicon atom, were, respectively, added to the sample I as a third ingredient to obtain samples II-VI. These organosilanes and organosiloxanes are particularly indicated in Table 1 along with the amounts used.

The samples I to VI were subjected to measurement of adhesive strength under shear with respect to iron and aluminium plates. The manner of measurement is described with reference to the accompanying drawing.

A 100×25×1 mm cold rolled JIS G-3, 141 iron plate 1, which had been polished on the surfaces thereof with a sand paper, and a JIS H-4,000 aluminium plate 2 were provided. A sample serving as a sealing material 3 was applied onto an upper surface of one end of the respective plates 1 and 2, as shown, with an applied area of 25×10 mm. 2 mm thick plates of Teflon (commercial name of Du Pont de Nemours Co., Inc.) were placed as spacers 4 at opposite sides of the sealing material 3. On the iron plate 1 was placed an iron or aluminium plate 5 as used above, on which a weight of 500 g was mounted. This was subsequently allowed to stand under conditions of 20° C. and 55% R.H. over 96 hours for curing the applied material 3. Thereafter, the weight was removed, followed by immersion in an engine oil for automobiles, Castle Motor Oil 5W-30 (commercial name of Toyota Jiko Co., Ltd.) at 150° C. for 100 hours and measurement of an adhesive strength under shear.

The results are shown in Table 1.

Moreover, 2 mm thick sheets were prepared from the samples I and II and allowed to stand under conditions of 20° C. and 55% R.H. for 7 days thereby obtaining cured elastomer sheets. The cured sheets were each immersed in the above engine oil, Castle Motor Oil 5W-30, kept at 150° C., for 100 hours and 250 hours. The immersed sheets were subsequently subjected to measurement of physical properties with the results shown in Table 2.

TABLE 1

| Composition No. | Comp. Ex. 1 I | Example 1 II | 2 III | 3 IV | 4 V | 5 VI |
|---|---|---|---|---|---|---|
| Third Ingredient: | | | | | | |
| Type | — | co-hydrolyzate of vinyldimethyl-chlorosilane and tetrachlorosilane | alpha, omega-dihydrovinyl-methylpolysiloxane of polymerization of 500 | vinyldimethyl-silanol | trivinylsilanol | 1,3,5,7-tetramethyl-1-hydroxy-3,5,7-trivinylcyclotetrasiloxane |
| amount (parts) | — | 5.0 | 5.0 | 0.5 | 0.5 | 0.5 |

TABLE 1-continued

| Composition No. | Comp. Ex. 1 I | Example 1 II | 2 III | 3 IV | 4 V | 5 VI |
|---|---|---|---|---|---|---|
| Adhesive St. to the iron under shear (kgf/cm²) | 0 | 3.8 | 3.8 | 1.6 | 2.8 | 3.4 |
| Adhesive St. to the Al under shear (kgf/cm²) | 4.6 | 10.0 | 5.5 | 5.2 | 5.6 | 8.3 |

TABLE 2

| | Sample No. | |
|---|---|---|
| | I | II |
| Initial Physical Characteristics: | | |
| Hardness (JIS-A) | 62 | 58 |
| Tensile strength (kgf/cm²) | 40 | 59 |
| Elongation (%) | 170 | 200 |
| After Immersion In The Engine Oil at 150°C. For 100 hours: | | |
| Hardness (JIS-A) | 32 | 33 |
| Tensile Strength (kgf/cm²) | 19 | 24 |
| Elongation (%) | 250 | 250 |
| After Immersion In The Engine Oil At 150°C. For 250 Hours: | | |
| Hardness (JIS-A) | 33 | 37 |
| Tensile Strength (kgf/cm²) | 12 | 20 |
| Elongation (%) | 150 | 190 |

EXAMPLES 6–8 AND COMPARATIVE EXAMPLE 2

100 parts of dimethylpolysiloxane blocked with a hydroxyl group at both ends of the molecular chain and having a viscosity of 20,500 centistokes, 7 parts of methyltriisopropenoxysilane, 0.7 parts of a guanidyl group-containing silane of the following formula

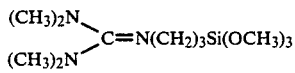

1.0 part of gamma-aminopropyltriethoxysilane, 100 parts of quartz powder, and 10 parts of fumed silica were mixed under water-free conditions to obtain sample VII. A co-hydrolyzate of vinyldimethylchlorosilane and tetrachlorosilane was added to the sample VII in amounts indicated in Table 3 to obtain samples VIII to X.

These samples VII to X were each used to make a sample for the measurement of adhesive strength under shear in the same manner as in Examples 1 to 5 and subjected to determination of adhesive strength under shear after immersion in the Castle Motor Oil kept at 150° C. for 100 hours. The results are shown in Table 3.

TABLE 3

| Composition No. | Comp. Ex. 2 VII | Example 6 VIII | 7 IX | 8 X |
|---|---|---|---|---|
| Amount of Co-hydrolyzate (parts) | — | 1.0 | 5.0 | 10.0 |
| Adhesive strength to iron under shear (kgf/cm²) | 0 | 1.7 | 3.9 | 4.2 |
| Adhesive strength to | 4.2 | 7.2 | 10.4 | 12.2 |

TABLE 3-continued

| Composition No. | Comp. Ex. 2 VII | Example 6 VIII | 7 IX | 8 X |
|---|---|---|---|---|
| Al under shear (kgf/cm²) | | | | |

EXAMPLE 9 AND COMPARATIVE EXAMPLE 3

100 parts of dimethylpolysiloxane blocked with a hydroxyl group at both ends of the molecular chain and having a viscosity of 5,200 centistokes, 20 parts of vinyl-tributanoxymonosilane, 0.2 parts of dibutyl tin dioctolate, 85 parts of zinc carbonate, 20 parts of fumed silica, 2 parts of gamma-aminopropyltriethoxysilane, and 5 parts of potassium methacrylate were mixed under water-free conditions to obtain sample XI. 6 parts of a co-hydrolyzate of vinyldimethylchlorosilane and tetrachlorosilane were added to the sample XI to obtain sample XII. These samples were treated in the same manner as in Examples 1 to 5 to obtain rubbery elastomers. These elastomers were each immersed in a gear oil for automobiles, Castle MG Gear Oil Special 75W-90 (commercial name of Toyota Jiko Co., Ltd.), kept at 120° C., for 10 days and subjected to measurement of physical properties. The results are shown in Table 4.

Moreover, specimens for measuring an adhesive strength under shear were made using the samples XI and XII in a manner as illustrated in the sale figure. These specimens were immersed in the gear oil kept at 120° C. for 10 days to measure an adhesive strength under shear, with the results shown in Table 4.

TABLE 4

| | Sample No. | |
|---|---|---|
| | XI | XII |
| Initial Properties: | | |
| Hardness (JIS-A) | 52 | 49 |
| Tensile strength (kgf/cm²) | 31 | 24 |
| Elongation (%) | 270 | 400 |
| Adhesive strength to iron under shear (kgf/cm²) | 14 | 13 |
| Adhesive strength to Al under shear (kgf/cm²) | 13 | 11 |
| After immersion in the gear oil of 120° C. for 10 hours: | | |
| Hardness (JIS-A) | 32 | 22 |
| Tensile strength (kgf/cm²) | 6.5 | 8.4 |
| Elongation (%) | 180 | 230 |
| Adhesive strength to iron under shear (kgf/cm²) | 0.6 | 8.0 |
| Adhesive strength to Al under shear (kgf/cm²) | 5.0 | 13.0 |

What is claimed is:

1. A room temperature vulcanizable organopolysiloxane composition, comprising the following first to third ingredients:

100 parts by weight of a diorganopolysiloxane blocked with a hydroxyl group at both ends of the molecule and having the formula

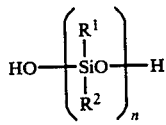

wherein $R^1$ and $R^2$ independently represent an alkyl group having from 1 to 8 carbon atoms, a cyclohexyl group, an alkenyl group or an aryl group with or without a halogen substituent and n is an integer such that the diorganopolysiloxane has a viscosity in the range of 25 to 500,000 centistokes at 25° C.;

from 0.5 to 30 parts by weight of an organosilane or siloxane having at least two hydrolyzable groups bonded to the silicon atom or atoms in one molecule; and from 0.1 to 100 parts by weight of an organosilane or a branched organosiloxane obtained by co-hydrolysis of a monofunctional chlorosilane and a trifunctional or tetrafunctional silane, said organosilane or branched organosiloxane having at least one vinyl group and at least one hydroxyl group each bonded to a silicon atom in the molecule.

2. A room temperature vulcanizable organopolysiloxane composition according to claim 1, wherein the second ingredient is an organosiloxane.

3. A room temperature vulcanizable organopolysiloxane composition according to claim 2, wherein the second ingredient is an organosilane.

4. A room temperature vulcanizable organopolysiloxane composition according to claim 1, wherein the third ingredient is the organosilane.

5. A room temperature vulcanizable organopolysiloxane composition according to claim 4, wherein said third ingredient organosilane is a compound of the following formula

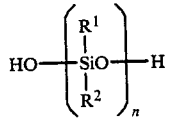

6. A room temperature vulcanizable organopolysiloxane composition according to claim 4, wherein said third ingredient organosilane is a compound of the following formula

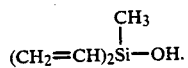

7. A room temperature vulcanizable organopolysiloxane composition according to claim 4, wherein said third ingredient organosilane is a compound of the following formula $(CH_2=CH)_3Si-OH$.

8. A room temperature vulcanizable organopolysiloxane composition according to claim 1, wherein the third ingredient is the branched organosiloxane.

9. A room temperature vulcanizable organopolysiloxane composition according to claim 1, wherein the third ingredient is used in an amount of from 0.5 to 30 parts by weight per 100 parts by weight of the first ingredient.

10. A room temperature vulcanizable organopolysiloxane composition according to claim 1, further comprising not larger than 500 parts by weight of a filler per 100 parts by weight of the first ingredient.

11. A room temperature vulcanizable organopolysiloxane composition according to claim 10, wherein the filler is used in amount of from 10 to 200 parts by weight per 100 parts by weight of the first ingredient.

12. A cured product of the room temperature vulcanizable organopolysiloxane composition of claim 1.

13. A room temperature vulcanizable organopolysiloxane composition, comprising the following first to third ingredients:

100 parts by weight of a diorganopolysiloxane blocked with a hydroxyl group at both ends of the molecule and having the formula

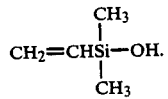

wherein $R^1$ and $R^2$ independently represent an alkyl group having from 1 to 8 carbon atoms, a cyclohexyl group or an aryl group with or without a halogen substituent and n is an integer such that the diorganopolysiloxane has a viscosity in the range of 25 to 500,000 centistokes at 25° C.;

from 0.5 to 30 parts by weight of an organosilane or siloxane having at least two hydrolyzable groups bonded to the silicon atom or atoms in one molecule; and from 0.1 to 100 parts by weight of an organosilane or a branched organosiloxane obtained by co-hydrolysis of a monofunctional chlorisilane and a trifunctional or tetrafunctional silane, said organosilane or branched organosiloxane having at least one vinyl group and at least one hydroxyl group each bonded to a silicon atom in the molecule.

* * * * *